(12) United States Patent
Kakumoto

(10) Patent No.: US 10,114,361 B2
(45) Date of Patent: Oct. 30, 2018

(54) MACHINE TOOL COLLISION DETECTING APPARATUS EQUIPPED WITH COLLISION STRESS RELEASING DEVICE

(71) Applicant: NAKAMURA-TOME PRECISION INDUSTRY CO., LTD., Hakusan-shi, Ishikawa (JP)

(72) Inventor: Masahiko Kakumoto, Hakusan (JP)

(73) Assignee: NAKAMURA-TOME PRECISION INDUSTRY CO., LTD., Hakusan-shi, Ishikawa (JP)

(*) Notice: Subject to any disclaimer, the term of this patent is extended or adjusted under 35 U.S.C. 154(b) by 68 days.

(21) Appl. No.: 15/588,814

(22) Filed: May 8, 2017

(65) Prior Publication Data
US 2017/0322540 A1    Nov. 9, 2017

(30) Foreign Application Priority Data
May 9, 2016    (JP) .................................. 2016-094034

(51) Int. Cl.
| | |
|---|---|
| *H02P 29/028* | (2016.01) |
| *G05B 19/4061* | (2006.01) |
| *B23Q 17/22* | (2006.01) |
| *F16P 7/02* | (2006.01) |
| *G05B 19/416* | (2006.01) |
| *H02H 7/085* | (2006.01) |

(52) U.S. Cl.
CPC ..... *G05B 19/4061* (2013.01); *B23Q 17/2208* (2013.01); *F16P 7/02* (2013.01); *G05B 19/4163* (2013.01); *H02H 7/0851* (2013.01); *H02P 29/028* (2013.01); *G05B 2219/37237* (2013.01); *G05B 2219/37624* (2013.01)

(58) Field of Classification Search
CPC ...................................................... H02P 29/028
USPC .................................................. 318/566, 563
See application file for complete search history.

(56) References Cited

U.S. PATENT DOCUMENTS 9,358,682 B2 * 6/2016 Ruiz Morales .......... B25J 9/041

FOREIGN PATENT DOCUMENTS

| JP | H11-165240 A | 6/1999 |
|---|---|---|
| JP | 3529010 B2 | 5/2004 |

OTHER PUBLICATIONS

European Search Report in corresponding European Application No. 17170124.6 dated Dec. 22, 2017.

* cited by examiner

*Primary Examiner* — David S Luo
(74) *Attorney, Agent, or Firm* — Bacon & Thomas, PLLC

(57) ABSTRACT

A collision stress releasing device reversely rotates a feed motor by a return amount set in a return amount setter based on a contact position of a movement unit or a collision detection position regarded as a contact position. Generally, a large error does not occur even when the collision detection position is regarded as the contact position, but when the movement unit or the colliding member has low rigidity, a control of setting a return amount in response to the speed of the movement unit or a control of estimating an actual contact position from a rise curve of a load after a collision is more desirable.

7 Claims, 5 Drawing Sheets

MACHINE TOOL COLLISION DETECTING APPARATUS EQUIPPED WITH COLLISION STRESS RELEASING DEVICE

TECHNICAL FIELD

The present invention relates to a collision detecting apparatus provided in a machine tool, and particularly, to a collision detecting apparatus equipped with a collision stress releasing device. The collision stress releasing device is a device which releases a stress remaining in a movement unit or the other member after a machine is emergently stopped due to a collision between the movement unit (a movement headstock or a tool post of a machine tool body, an arm or a hand of a work loader or unloader, or the like) and the other member.

BACKGROUND ART

A movement unit is driven by a feed motor controlled by a NC machine. The NC machine controls a position and a speed of the movement unit and prevents an excessive load from being applied to the movement unit by restricting a torque of a feed motor if necessary.

In general, a multi-axis control is performed in accordance with a recent development of a control technology. Further, an unmanned processing operation for a long period of time is also generally performed by an integral control of a machine tool and a conveying device such as a work load or unloader.

When an automation of the machine tool is developed, an accident such as a collision of the movement unit with respect to the other member easily occurs due to a control error or a supply error of the work. Therefore, when a collision accident occurs, a control of detecting an overload acting on the movement unit and emergently stopping the movement unit is performed in order to minimize damage to the work or machine.

For example, a tool post 4a of a lathe illustrated in FIG. 6 moves in the X and Z directions by the rotation of an X-axis feed motor 5x and a Z-axis feed motor 5z and a work w gripped by a spindle chuck 7 is processed by a tool 6 attached to the tool post. The tool post 4a moves at a low speed during a processing operation in response to a speed instruction e from the NC machine to the X-axis motor 5x and the Z-axis motor 5z and moves at a high speed when moving to the next position after the processing operation on one block ends.

A work loader illustrated in FIG. 7 loads a material work w gripped by a work hand 4b of a tip of an arm 8 into the spindle chuck 7 of the lathe. The work hand 4b moves at a high speed u from a standby position indicated by an imaginary line in FIG. 7 to a position near the spindle chuck 7 and moves at a low speed v in the Z direction to insert the material work w into the spindle chuck 7.

There is a case where the tool post 4a or the tool 6 in a moving state collides with the spindle chuck 7 or the work w due to an erroneous processing program or a wrong material work. In order to prevent damage of the machine or the work due to a collision, a collision detecting apparatus which emergently stops the feed motor 5 by the detection of a collision is provided.

A Z-direction emergency stop device of FIG. 6 will be described. A current meter 18 is provided in a power supply circuit of a Z-axis feed motor 5z. When the moving tool 6 collides with the work w or the chuck 7, a current of the motor 5z increases due to an overload generated by the collision. When the current exceeds a value set by a setter 35, an emergency stop signal a is output from a comparator 31 so that the feed motor 5z is emergently stopped. Although not illustrated in the drawings, the same emergency stop device is also provided in the X-axis feed motor 5x.

The collision detecting apparatus which electrically detects the overload can easily change a setting value and the machine can be easily recovered to a normal state after the emergency stop. Further, when the feed motor 5 is slightly rotated reversely after the emergency stop, a stress generated in the movement unit or the colliding member due to the collision is released and thus damage to the machine or the work can be reduced.

In Patent Document 1, the present applicant proposes a method in which a plurality of collision detection setting loads are set in a load setter 35, a high setting load is automatically selected when a low-speed movement instruction is given from the NC machine to the movement unit, and a low setting load is automatically selected when a high-speed movement instruction is given. Further, a method of gradually or continuously changing a low setting load in response to an instructed movement speed e is also proposed. Accordingly, it is possible to reduce damage of the work or the machine when the movement unit collides with the work or the other member of the machine. In particular, it is possible to reduce damage in the event of a collision when the movement unit moves at a high speed.

CITATION LIST

Patent Document

Patent Document 1: JP 3529010 B1

SUMMARY OF THE INVENTION

Problem to be Solved by the Invention

Although it is an extremely short time until the stop of the movement unit after the detection of the collision, a time delay occurs. Due to the time delay, a collision stress (a stress corresponding to a movement distance of the movement unit until the stop of the movement unit after the contact of both members) remains in both colliding members. The collision stress gets increases when the speed of the movement unit becomes faster. In particular, when a collision occurs during an unmanned continuous operation, a collision stress is continuously applied to both colliding members and thus concern of damage to the machine increases. Here, as described above, the feed motor is slightly rotated reversely after the collision to release the collision stress.

In the related art, the collision stress is released by reversely rotating the feed motor by the set return amount from the stop position of the movement unit. Although the return amount necessary to release the collision stress due to the rigidity of the colliding member or the collision speed is not constant, the collision stress can be released in the event of a collision at any condition when a sufficient return amount is set.

However, for example, when the tool post collides with the arm of the work loader having low rigidity or collides with the work during the processing operation, there is a large difference in the return amount for releasing the collision stress. When the movement distance of the movement unit after the collision (after the contact) is large, the colliding members are in contact with each other even after the return movement and thus an increase in damage after the collision.

In recent years, there is a need to perform highly accurate processing and fine processing by the machine tool. In the machine tool which performs fine processing, when the return amount of the movement unit after the collision is set to be large, there is a risk that the movement unit may collide with the opposite member during the return movement. In order to prevent this new problem, it is desirable to set the return amount of the movement unit after the movement unit stops due to the collision to be a necessary minimum return amount.

The invention has been made to solve the above-described problems accompanied by a return movement of a movement unit for releasing a collision stress generated by a collision and an object of the invention is to more appropriately control a reverse rotation amount of a feed motor for releasing a collision stress.

Means for Solving Problem

The invention solves the above-described problems by a collision detecting apparatus which emergently stops a machine by detecting an abnormal load acting on a movement unit 4 such as a tool post 4a or a work hand 4b of a loader during an operation of a NC machine tool. That is, a return position of the movement unit 4 is obtained based on a collision detection position or a contact position after a collision is detected. When the movement unit 4 is returned to the return position after the collision is detected, it is possible to prevent damage (stress) to the machine due to a remaining stress (a collision stress) generated by the collision.

That is, the collision detecting apparatus of the invention is a machine tool collision detecting apparatus including an emergency stop device 34 which emergently stops a feed motor 5 by outputting a collision detection signal d when an operating load b of a feed motor 5 driving a movement unit 4 (4a, 4b) reaches a collision detection setting load c set by a load setter 35 and a collision stress releasing device 2 which reversely rotates the feed motor by a return amount set in a return amount setter 22 (22a, 22b, 22c) after the feed motor 5 is emergently stopped, in which the collision stress releasing device 2 reversely rotates the feed motor 5 by the return amount set by the return amount setter 22 based on a contact position of the movement unit 4 or a collision detection position regarded as a contact position.

There is a time delay in a detection system necessary for processing an electric signal until the setting load c set by the load setter 35 is detected after the collision. Meanwhile, a time delay chiefly caused by the inertia of the movement unit (including a drive system) occurs until the movement unit 4 stops after the detection of the setting load c. Since the time delay of the detection system is much smaller than the time delay caused by the inertia, a large error does not occur even when the collision detection position is regarded as the contact position regardless of the speed of the movement unit.

Meanwhile, when the movement unit 4 or the colliding member has low rigidity (mainly support rigidity), an error occurs between the actual contact position and the collision detection position due to the deflection. In such a case, a control of setting the return amount in response to the speed of the movement unit 4 or a control of estimating the actual contact position from the rise curve of the load after the collision is more desirable.

As a detailed example of a control in consideration of an influence of the movement speed of the movement unit 4 in the event of the collision, a control of setting a plurality of return amounts in a return amount setter 22b and automatically setting the return amount in response to the movement speed range of the movement unit 4 or a control of providing a return amount setter 22c calculating the return amount by using the movement speed as a variable and automatically calculating the return amount in response to the movement speed can be exemplified.

Effect of the Invention

According to the invention, it is possible to return colliding members to a non-contact state even when a return amount is set to be small. Thus, it is possible to minimize damage to a machine caused by a stress remaining in the members in accordance with a long period of a collision while the colliding members are in contact with each other.

Further, since it is possible to reliably release a contact between the colliding members even a small return amount, it is possible to prevent an accident in which the movement unit 4 collides with the opposite member during a return movement.

Thus, according to the invention, there is an effect that damage of a machine caused by a collision between machine members during an operation, particularly, an unmanned operation for a long period of time can be minimized.

MODE(S) FOR CARRYING OUT THE INVENTION

Figure 1:
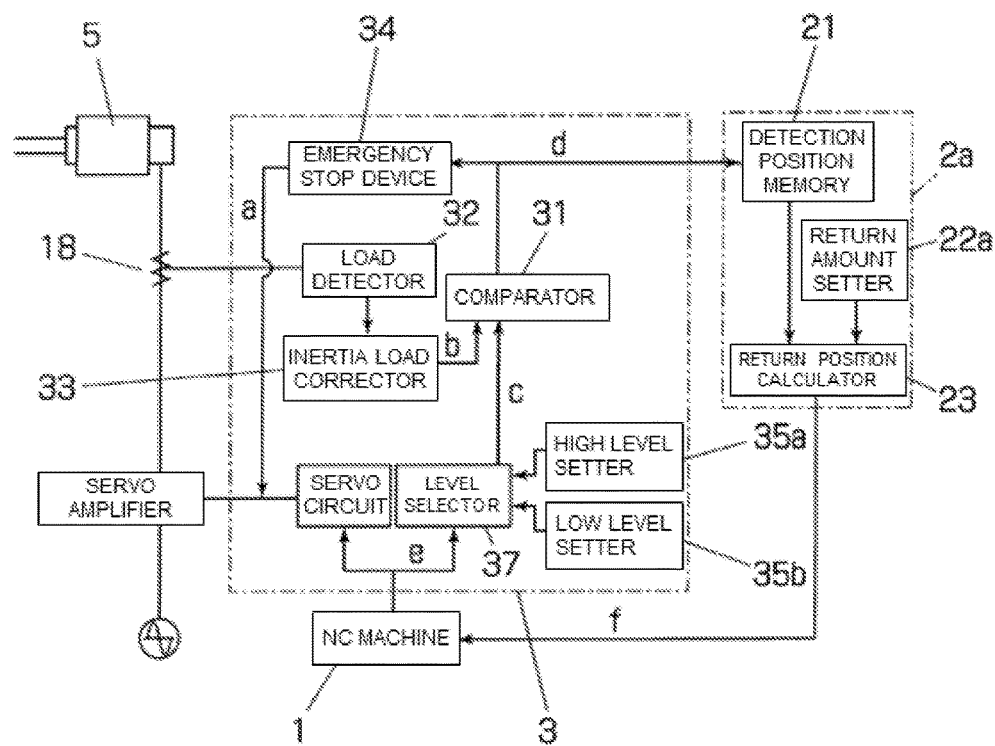
FIG. 1 is a block diagram of a first embodiment.

Hereinafter, embodiments of the invention will be described by exemplifying a case where the invention is embodied by a collision detecting apparatus proposed in Patent Document 1. In the drawings, Reference Numeral 1 denotes an NC machine which controls the operation of a movement unit 4 (4a, 4b) and Reference Numeral 2 (2a, 2b, 2c, 2d) denotes a collision stress releasing device which is added to a collision detecting apparatus 3 described in Patent Document 1.

A load detection current meter 18 is provided in a power supply circuit of a feed motor 5 which drives the movement unit 4. In accordance with an output value of the current meter 18, a load detector 32 detects an output torque of the feed motor 5 and an inertia load corrector 33 detects an output torque obtained by correcting the inertia load of the movement unit 4 (4a, 4b). As a setter which sets a collision detection overload, a high level setter 35a and a low level setter 35b are provided.

A level selector 37 selects a load set in a high level setter 35a and gives the load to a comparator 31 when a low-speed movement instruction is given from the NC machine 1 to the feed motor 5 and selects a load set by a low level setter 35b and outputs the load to the comparator 31 when a low-speed movement instruction is given from the NC machine 1 to the feed motor 5.

The comparator 31 compares an operating load (hereinafter, referred to as a "detection load") b detected by the inertia load corrector 33 with a setting load c set by the level selector 37. When the detection load b reaches the setting load c, a collision detection signal d is given to an emergency stop device 34 and the emergency stop device 34 which receives the signal emergently stops the feed motor 5.

Additionally, as described in Patent Document 1 when three or more setting values having different levels are set in the low level setter 35b, a lower level setting value can be selected by the level selector 37 as an instruction value of a speed instruction e from the NC machine 1 becomes faster and the value can be used as the collision detection setting load c. Further, when a level calculator which calculates a lower value as the speed of the movement unit becomes faster based on a predetermined constant and the speed instruction e from the NC machine 1 is registered in the low level setter 35b, the setting load c can be calculated in response to the instruction value of the speed instruction e from the NC machine 1.

A collision stress releasing device 2a of the first embodiment indicated by an imaginary line of FIG. 1 includes a detection position memory 21, a return amount setter 22a, and a return position calculator 23. When the detection position memory 21 receives the collision detection signal d from the comparator 31, the detection position memory stores a position of the movement unit 4 or a phase of the feed motor 5 at that time. A return amount of the movement unit 4 or a reverse rotation amount of the feed motor 5 based on the position of the movement unit (the collision detection position) when the collision detection signal d is given to the memory is set to the return amount setter 22a. The return position calculator 23 calculates a position in which the movement unit 4 is returned by the return amount set in the return amount setter 22a from the collision detection position stored in the detection position memory 21 (a return position) and transmits a return position signal f to the NC machine 1. After the NC machine 1 receives a stop signal of the feed motor 5, the NC machine moves the movement unit 4 to the return position to release a load generated by the collision.

When a collision is a collision between members having high rigidity as in the collision between the tool post and the work, the detection load b immediately reaches the setting load c immediately after the collision. For this reason, the return position can be calculated by regarding the collision detection position as the contact position. So, there is no need to worry about a case where the machine stops while the colliding members contact each other due to an insufficient return amount or the movement unit collides with the opposite member during a return operation due to an excessive return amount.

However, in the case of a collision between members having low rigidity as in a collision between the work and the drill attached to the tool post or a collision between the spindle chuck and the work gripped by the arm tip of the loader, since a load at the time of a collision gently rises due to the deflection of the drill or the arm, there is a case where a significant difference is generated between the collision detection position and the contact position of the colliding members.

In such a case, when the return position is calculated by regarding the collision detection position as the contact position, there is a concern that the colliding members may be in contact with each other even after the return operation. When there is such a concern, a second embodiment in which a plurality of loads are set in the load setter 35 in response to the speed range of the movement unit or a third embodiment in which the contact position is more accurately calculated can be employed.

Figure 2:
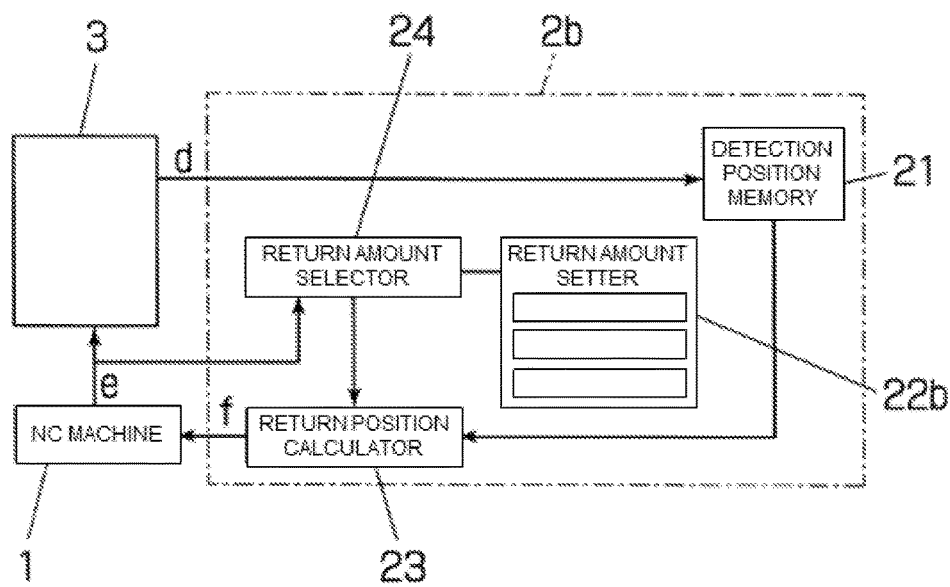
FIG. 2 is a block diagram of a second embodiment.

FIG. 2 is an example of the collision stress releasing device in which a plurality of return amounts are set for each of the movement speed ranges of the movement unit before the collision. In the second embodiment, a return amount setter 22b capable of setting a plurality of return amounts and a return amount selector 24 are provided. A return amount for each of predetermined speed ranges of the movement instruction given from the NC machine 1 to the feed motor 5 of the movement unit is set in the return amount setter 22b. The return amount selector 24 receives the speed instruction e from the NC machine 1, selects a speed rage setting amount including the speed instruction, and gives the speed range setting amount to the return position calculator 23. Accordingly, the return position calculator 23 can calculate a return position corresponding to the speed range of the movement unit in the event of a collision.

Figure 3:
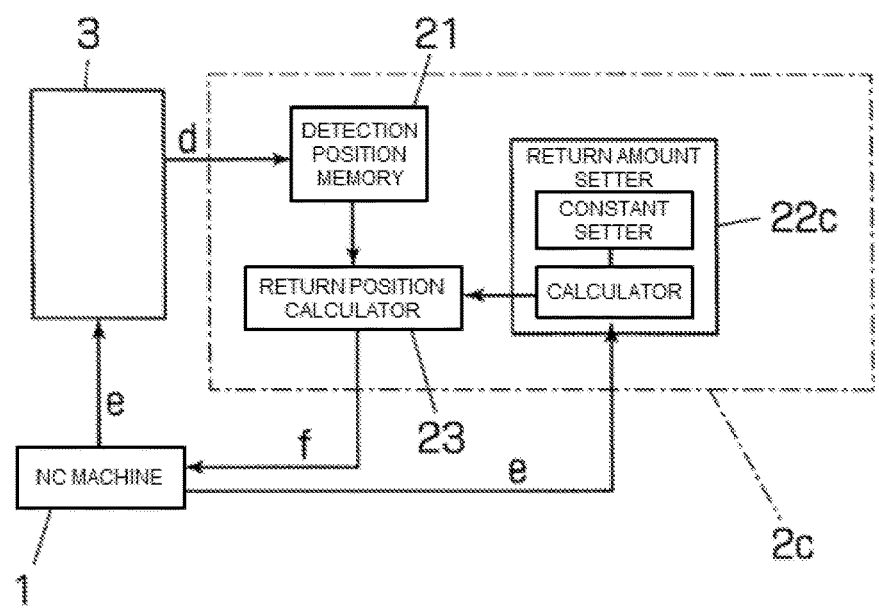
FIG. 3 is a block diagram of a third embodiment.

A second embodiment of FIG. 2 is an example in which a return amount is changed step by step in response to the speed of the movement unit. A third embodiment illustrated in FIG. 3 is an example in which a return amount is continuously changed in response to the speed of the movement unit. In the third embodiment, an arithmetic expression which calculates a return amount by using a constant and the speed instruction e given from the NC machine 1 to the feed motor 5 is registered in the return amount setter 22c. The return position calculator 23 obtains the return position of the movement unit 4 based on the return amount calculated by the arithmetic expression.

Figure 4:
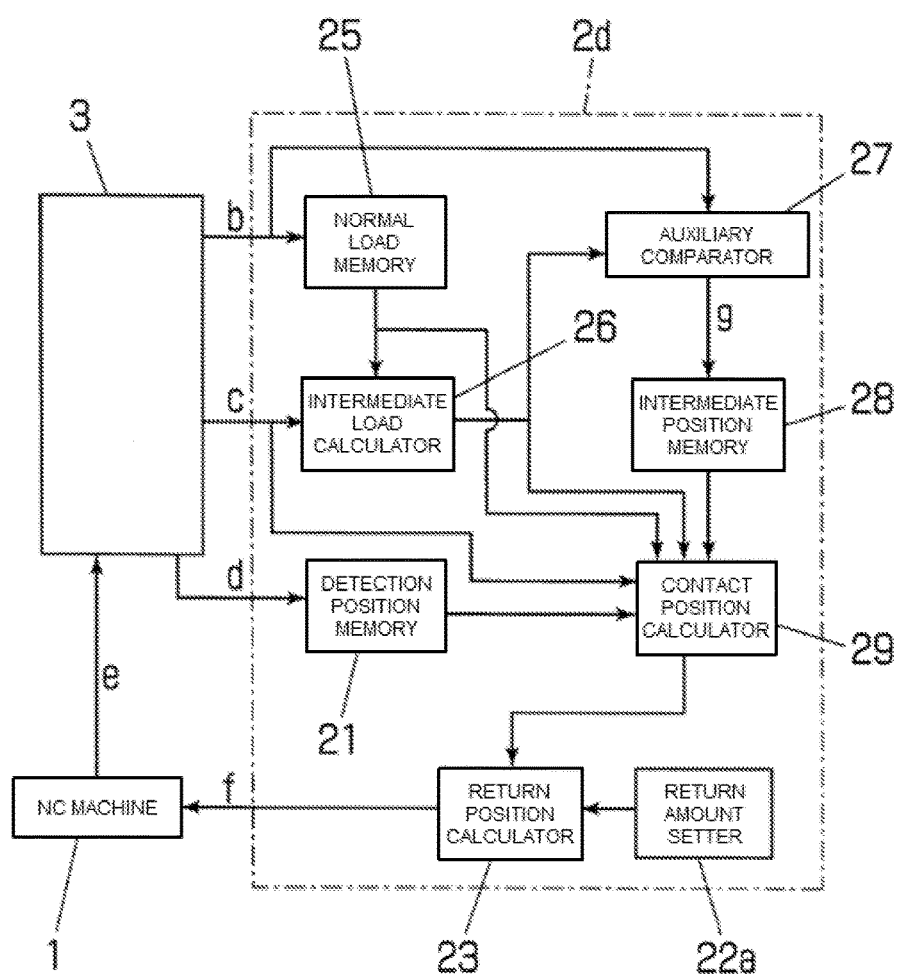
FIG. 4 is a block diagram of a fourth embodiment.
Figure 5:
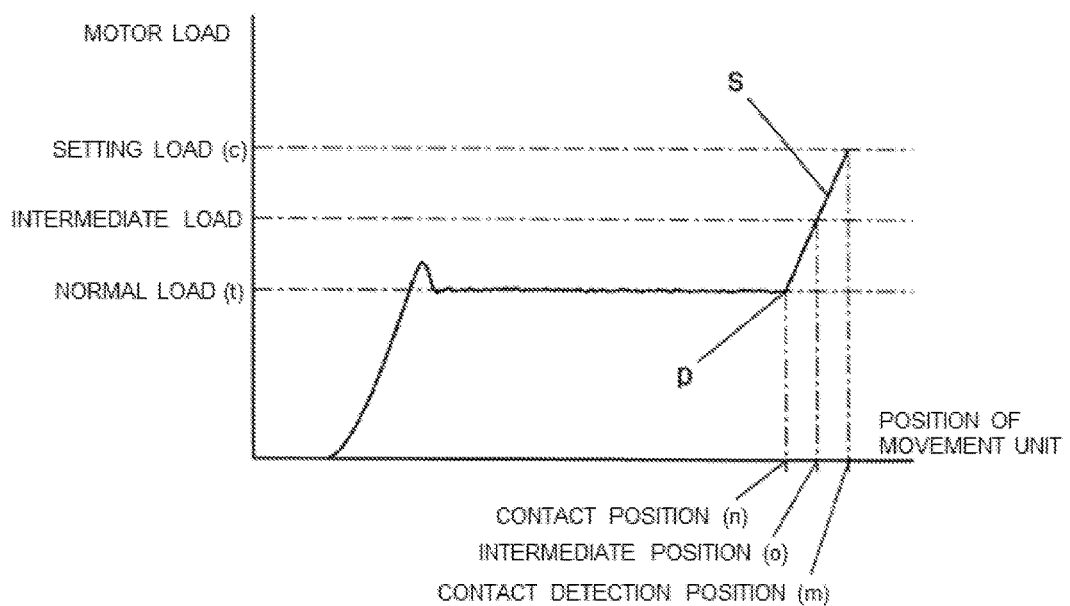
FIG. 5 is an explanatory diagram showing a contact position calculating method of the fourth embodiment.
Figure 6:
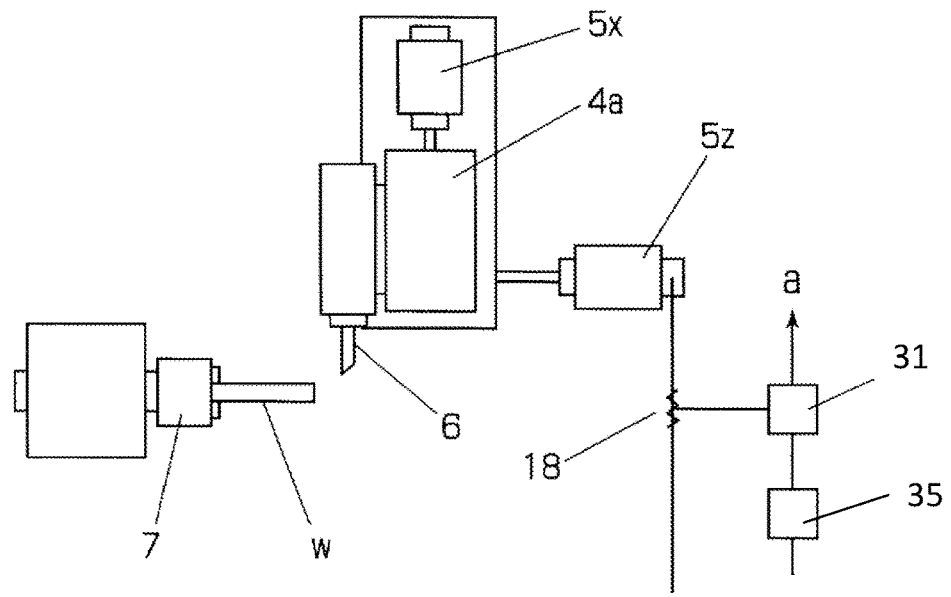
FIG. 6 is an explanatory diagram illustrating an operation of a tool post.
Figure 7:
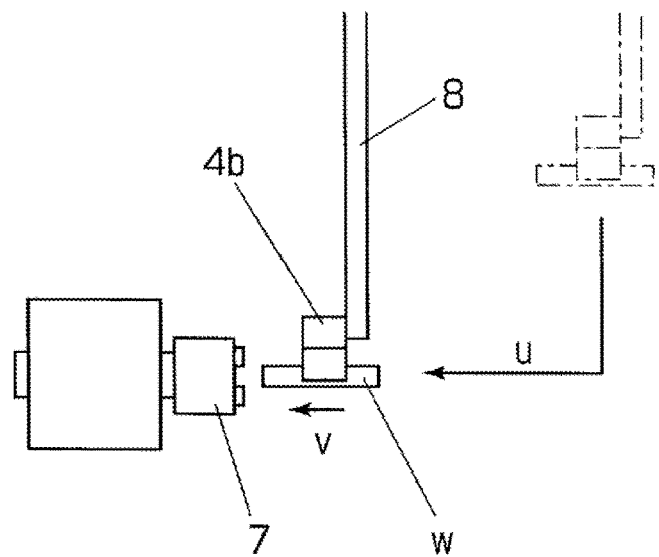
FIG. 7 is an explanatory diagram illustrating an operation of a loader.

A fourth embodiment illustrated in FIG. 4 is an example in which an intersection point p between a rise line s and a normal load t of the feed motor 5 before a collision is set as a contact position and the return position of the movement unit 4 is obtained based on the contact position on the assumption that the load of the feed motor 5 linearly rises to the collision detection setting load c as shown in FIG. 5.

A collision stress releasing device 2d of the fourth embodiment includes a normal load memory 25, an intermediate load calculator 26, an auxiliary comparator 27, an intermediate position memory 28, and a contact position calculator 29 in addition to the detection position memory 21, the return amount setter 22a, and the return position calculator 23 described in the first embodiment.

The normal load memory 25 sequentially updates a load by inputting the detection load b given from the inertia load corrector 33 at all times and calculating an average value of the most recent normal load in a predetermined range. The intermediate load calculator 26 stores an intermediate load between the load set by the load setter 35 and the most recent load calculated by the normal load memory 25 by a calculation whenever the calculation value of the normal load memory 25 is sequentially updated. When the detection load b given from the inertia load corrector matches the calculation value of the intermediate load calculator at that time, the auxiliary comparator 27 outputs an intermediate load detection signal g and the intermediate position memory 28 stores a position of the movement unit (a position o of FIG. 5) at that time.

Subsequently, when an overload is detected and a collision detection position m is detected, the contact position calculator 29 calculates a contact position n (FIG. 5) based on the collision detection position and the intermediate position and gives the contact position to the return position calculator 23. The return position calculator 23 calculates a position in which the movement unit 4 is returned from the contact position n by the return amount set in the return amount setter 22a and gives the return position signal f to the NC machine 1. After the NC machine receives the stop signal of the feed motor 5, the movement unit moves to the return position.

As understood from the description above, according to the invention, it is possible to set a necessary minimum return amount by eliminating an error or a variation in traveling until the stop of the movement unit after a collision is detected. Thus, it is possible to prevent a problem in which degradation in members occurs due to a long period of stop of a machine while a collision stress acts on both colliding members when the set return amount is smaller than the necessary return amount or the movement unit collides with the opposite member during a return operation when the set return amount is larger than the necessary return amount.

EXPLANATIONS OF LETTERS OR NUMERALS 2 collision stress releasing device
4 movement unit
4a tool post
4b work hand
5 feed motor
22 (22a, 22b, 22c) return amount setter
34 emergency stop device
35 load setter
b operating load
c setting load
d collision detection signal

The invention claimed is:

1. A machine tool collision detecting apparatus comprising:
   an emergency stop device which emergently stops a feed motor by outputting a collision detection signal when an operating load of a feed motor driving a movement unit reaches a collision detection setting load set by a setter; and
   a collision stress releasing device which reversely rotates the feed motor only by a return amount set by a return amount setter after the emergency stop of the feed motor,
   wherein the collision stress releasing device reversely rotates the feed motor only by the return amount set by the return amount setter based on a contact position of a member colliding with the movement unit.

2. The machine tool collision detecting apparatus according to claim 1,
   wherein the collision stress releasing device reversely rotates the feed motor by regarding a position of the movement unit when the operating load reaches the setting load as the contact position.

3. The machine tool collision detecting apparatus according to claim 2, further comprising:
   the return amount setter which is able to set a plurality of return amounts; and
   a return amount selector,
   wherein the return amount selector selects a small return amount when a low-speed movement instruction is given to the feed motor and selects a large return amount when a high-speed movement instruction is given to the feed motor, and
   wherein the collision stress releasing device reversely rotates the feed motor only by the selected return amount.

4. The machine tool collision detecting apparatus according to claim 2,
   wherein the return amount setter includes a constant setter and a return amount setter which calculates a return amount in accordance with a setting value set by the constant setter and an instruction value of a speed instruction given from an NC machine to the feed motor, and
   wherein the return amount setter calculates a larger return amount as the value of the speed instruction increases.

5. The machine tool collision detecting apparatus according to claim 1, further comprising:
   a normal load memory which sequentially updates the operating load in a predetermined period during the movement of the movement unit;
   an intermediate load calculator which sequentially calculates an intermediate load corresponding to a load between the stored normal load and the setting load by a calculation;
   a contact position calculator; and
   an auxiliary comparator which compares the operating load and the intermediate load with each other and outputs an intermediate load signal when the operating load reaches the intermediate load,
   wherein the contact position calculator calculates the contact position based on the setting load, the position of the movement unit when the setting load is detected, the intermediate load immediately before the collision detection signal is given, the position of the movement unit when the intermediate load is detected, and a value stored in the normal load memory when the collision detection signal is given.

6. The machine tool collision detecting apparatus according to claim 1, further comprising:
   the return amount setter which is able to set a plurality of return amounts; and
   a return amount selector,
   wherein the return amount selector selects a small return amount when a low-speed movement instruction is given to the feed motor and selects a large return amount when a high-speed movement instruction is given to the feed motor, and
   wherein the collision stress releasing device reversely rotates the feed motor only by the selected return amount.

7. The machine tool collision detecting apparatus according to claim 1,
   wherein the return amount setter includes a constant setter and a return amount setter which calculates a return amount in accordance with a setting value set by the constant setter and an instruction value of a speed instruction given from an NC machine to the feed motor, and
   wherein the return amount setter calculates a larger return amount as the value of the speed instruction increases.

* * * * *